(12) United States Patent
Liu et al.

(10) Patent No.: US 11,405,154 B2
(45) Date of Patent: Aug. 2, 2022

(54) REFERENCE SIGNAL CONFIGURATION METHOD AND APPARATUS

(71) Applicant: Huawei Technologies Co., Ltd., Shenzhen (CN)

(72) Inventors: Yong Liu, Shanghai (CN); Lu Wu, Shenzhen (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 16/505,251

(22) Filed: Jul. 8, 2019

(65) Prior Publication Data

US 2019/0334676 A1 Oct. 31, 2019

Related U.S. Application Data

(63) Continuation of application No. PCT/CN2017/119357, filed on Dec. 28, 2017.

(30) Foreign Application Priority Data

Jan. 6, 2017 (CN) .......................... 201710011868.5
May 5, 2017 (CN) .......................... 201710313518.4

(51) Int. Cl.
*H04L 5/00* (2006.01)
*H04W 72/04* (2009.01)

(52) U.S. Cl.
CPC ....... *H04L 5/0048* (2013.01); *H04W 72/0406* (2013.01); *H04W 72/0486* (2013.01); *H04W 72/044* (2013.01)

(58) Field of Classification Search
CPC . H04L 27/2613; H04L 5/0007; H04L 5/0048; H04L 5/0053; H04L 5/0094;
(Continued)

(56) References Cited

U.S. PATENT DOCUMENTS

2008/0299984 A1* 12/2008 Shimomura ........ H04W 52/325
455/446
2014/0341114 A1 11/2014 Seo et al.
(Continued)

FOREIGN PATENT DOCUMENTS

CN 101754237 A 6/2010
CN 101771443 A 7/2010
(Continued)

OTHER PUBLICATIONS

"DL DM-RS for data transmissions," 3GPP TSG RAN WG1 Meeting #87, Reno, USA, R1-1611244, pp. 1-6, 3rd Generation Partnership Project, Valbonne, France (Nov. 14-18, 2016).
(Continued)

*Primary Examiner* — Zhensheng Zhang
(74) *Attorney, Agent, or Firm* — Leydig Voit & Mayer, Ltd.

(57) ABSTRACT

This application relates to the communications field and discloses a reference signal configuration method and apparatus, to improve accuracy of a channel estimation result in a complex and changeable scenario. The method may include: determining configuration information of a first reference signal, where the first reference signal is a reference signal corresponding to a first port that is used in one transmission process, a second port can also be used in the transmission process, and configuration information of a reference signal corresponding to the second port is different from the configuration information of the first reference signal; and configuring the first reference signal based on the configuration information of the first reference signal.

18 Claims, 5 Drawing Sheets

(58) Field of Classification Search
CPC ............. H04L 25/0226; H04L 27/2611; H04L 27/2614; H04W 24/00; H04W 72/0406; H04W 72/044; H04W 72/0486; H04W 72/042; H04W 72/0446; H04W 72/0453
See application file for complete search history.

(56) References Cited

U.S. PATENT DOCUMENTS

| | | | |
|---|---|---|---|
| 2016/0105264 | A1 | 4/2016 | Chen et al. |
| 2017/0318556 | A1* | 11/2017 | Lu .................... G01S 1/042 |
| 2018/0359123 | A1* | 12/2018 | Kimura ................ H04L 27/26 |
| 2019/0393999 | A1* | 12/2019 | Hasegawa ............ H04L 5/0007 |

FOREIGN PATENT DOCUMENTS

| | | | | |
|---|---|---|---|---|
| CN | 101841828 | A | | 9/2010 |
| CN | 101848017 | A | | 9/2010 |
| CN | 101873625 | A | | 10/2010 |
| CN | 101677306 | B | | 8/2012 |
| CN | 108270538 | A * | 7/2018 | ............. H04L 27/26 |
| EP | 2536231 | A1 | | 12/2012 |
| EP | 3474460 | A1 | | 4/2019 |
| EP | 3531606 | A1 | | 8/2019 |
| WO | 2018069257 | A1 | | 4/2018 |

OTHER PUBLICATIONS

"WF on DMRS Pattern Evaluation," 3GPP TSG RAN1 #87, Reno, USA, R1-1613651, pp. 1-4, 3rd Generation Partnership Project, Valbonne, France (Nov. 14-18, 2016).

"RS Design for DL Higher Order MIMO in LTE-A," 3GPP TSG RAN WG1 Meeting #55bis, Ljubljana, Slovenia, R1-090190, pp. 1-4, 3rd Generation Partnership Project, Valbonne, France (Jan. 12-16, 2009).

"DL Reference Signal Design for 8×8 MIMO in LTE-Advanced," 3GPP TSG-RAN1 #56, Athens, Greece, R1-090706, pp. 1-12, 3rd Generation Partnership Project, Valbonne, France (Feb. 9-13, 2009).

"Reference Signal Design for Demodulation in NR," 3GPP TSG RAN WG1 Meeting #86bis, Lisbon, Portugal, R1-1608818, pp. 1-6, 3rd Generation Partnership Project, Valbonne, France (Oct. 10-14, 2016).

* cited by examiner

REFERENCE SIGNAL CONFIGURATION METHOD AND APPARATUS

CROSS-REFERENCE TO RELATED APPLICATIONS

This application is a continuation of International Application No. PCT/CN2017/119357, filed on Dec. 28, 2017, which claims priority to Chinese Patent Application No. 201710011868.5, filed on Jan. 6, 2017 and Chinese Patent Application No. 201710313518.4, filed on May 5, 2017. All of the aforementioned patent applications are hereby incorporated by reference in their entireties.

TECHNICAL FIELD

This application relates to the communications field, and in particular, to a reference signal (RS) configuration method and apparatus.

BACKGROUND

An RS is a signal that is predicted by both a transmit end and a receive end. The receive end may perform channel estimation by using an RS sent by the transmit end, and estimate, based on a channel estimation result, a data signal sent by the transmit end.

Currently, an RS configuration method provided in a communications standard is as follows: In one transmission process, an RS corresponding to each port (namely, an antenna port) is usually generated based on a fixed sequence, and then the RS corresponding to each port is mapped to a physical resource block (PRB) in a fixed mapping mode based on a quantity of available ports. Functions of RSs corresponding to all ports in one transmission process are unique and are the same. In addition, once an RS corresponding to each port is configured, configuration information of the RS keeps unchanged.

In the foregoing technical solution, in one transmission process, an RS may be configured based on preset information such as a fixed mapping mode and a function of the RS provided that a quantity of available ports is determined. In addition, once an RS corresponding to each port is configured, configuration information of the RS keeps unchanged. Therefore, when the technical solution is applied to a complex and changeable scenario such as a high frequency band scenario or a high frequency selection scenario, a channel estimation result is inaccurate.

SUMMARY

Embodiments of the present application provide an RS configuration method and apparatus, to improve accuracy of a channel estimation result in a complex and changeable scenario.

According to a first aspect, an RS configuration method is provided, including: determining configuration information of a first RS, where the first RS is an RS corresponding to a first port that is used in one transmission process, a second port is also used in the transmission process, and configuration information of an RS corresponding to the second port is different from the configuration information of the first RS; and configuring the first RS based on the configuration information of the first RS. In this technical solution, in one transmission process, configuration information of RSs corresponding to different ports may be different. In other words, a technical solution for configuring an RS by using a port as a granularity is provided, and can be more adaptable to a complex and changeable scenario compared with a technical solution for configuring an RS by using a quantity of available ports as a granularity provided in the prior art. During specific implementation, an RS is configured based on an actual requirement, so that accuracy of a channel estimation result can be improved.

During actual implementation, the method may further include: sending the configured first RS.

In a possible design, the method may further include: sending indication information, where the indication information is used to instruct a receive end to determine the configuration information of the first RS.

For example, a base station may send the indication information to user equipment (UE) by using radio resource control (RRC) signaling or downlink control information (DCI). The base station may indicate the configuration information of the first RS to the UE in an explicit or implicit manner. For a specific implementation process of indicating the configuration information of the first RS, refer to the following descriptions. In this possible implementation, the receive end can learn of the first RS.

In a possible design, the indication information is DCI or media access control (MAC) signaling and is used to indicate the configuration information of the first RS. Before the sending indication information, the method may further include: sending system configuration signaling, where the system configuration signaling includes RRC signaling, the system configuration signaling includes at least one information entry, and one piece of configuration information of the first RS is recorded in each information entry.

In a possible design, the configuration information of the first RS may include at least one of the following information: a density of a resource occupied by the first RS, a function carried by the first RS, a transmission waveform used by the first RS, a type of a sequence of the first RS, a generation mode of the sequence of the first RS, and a resource multiplexing mode of the first RS. The density of the resource occupied by the first RS is a ratio of a quantity of resource elements (REs) occupied by the first RS to a quantity of REs used in the transmission process. Optionally, at least two functions are carried by the first RS.

In this possible design, the density of the resource occupied by the first RS is considered as the configuration information of the first RS. During actual implementation, the density of the resource occupied by the first RS may not be used as the configuration information of the first RS. Instead, that the density of the resource occupied by the first RS is used as the configuration information of the first RS is an implementation of determining location information of the resource occupied by the first RS, and the location information of the resource occupied by the first RS is used as one type of configuration information of the first RS. In this case, the indication information in the foregoing possible design may include information about the density of the resource occupied by the first RS, for example, information such as a density value or a density adjustment direction, and is used to instruct the receive end to determine a location of the resource occupied by the first RS.

In a possible design, the determining configuration information of a first RS may include: selecting a target pilot pattern from a preset pilot pattern set based on a current status of UE, where the current status of the UE includes at least one of the following information: a frame structure used by the UE to transmit information, a scenario in which the UE is located, a carrier frequency used for scheduling the UE, and a subcarrier spacing used by the UE to transmit the information; and obtaining the configuration information of the first RS based on the target pilot pattern.

Optionally, the target pilot pattern is corresponding to the configuration information of the first RS. There may be a correspondence between each preset pilot pattern and configuration information of a part or all of RSs transmitted in one transmission process. Optionally, the method may further include: sending indication information, where the indication information includes an identifier of the target pilot pattern. This optional implementation may be understood as indicating the configuration information of the first RS by using an implicit indication method.

In a possible design, the indication information includes DCI or MAC signaling and is used to indicate the target pilot pattern. Before the sending indication information, the method further includes: sending system configuration signaling, where the system configuration signaling includes RRC signaling, the system configuration signaling includes at least one information entry, and information about a pilot pattern of the first RS is recorded in each information entry.

In a possible design, if the configuration information of the first RS includes the density of the resource occupied by the first RS, the determining configuration information of a first RS may include: determining, based on at least one of a time-frequency characteristic of a channel corresponding to the first port, phase noise of the channel corresponding to the first port, system information of UE, system configuration information of the UE, and a moving speed of the UE, the density of the resource occupied by the first RS, where the first port is any port allocated to the UE. This possible design provides a technical solution for determining the density of the resource occupied by the first RS.

In a possible design, if the configuration information of the first RS includes the function carried by the first RS, the determining configuration information of a first RS may include: determining, based on at least one of a time-frequency characteristic of a channel corresponding to the first port and phase noise of the channel corresponding to the first port, the function carried by the first RS. This possible design provides a technical solution for determining the function carried by the first RS.

In a possible design, if the configuration information of the first RS includes the transmission waveform used by the first RS, the determining configuration information of a first RS may include: determining, based on at least one of channel quality information of a channel corresponding to the first port, a peak-to-average power ratio (PAPR) requirement of UE, and a quantity of scheduling layers of the UE, the transmission waveform used by the first RS, where the first port is any port allocated to the UE. This possible design provides a technical solution for determining the transmission waveform used by the first RS.

In a possible design, if the configuration information of the first RS includes the type of the sequence of the first RS, the determining configuration information of a first RS may include: determining the type of the sequence of the first RS based on at least one of the transmission waveform used by the first RS, a PAPR requirement of UE, and a scheduling flexibility requirement of the UE, where the first port is any port allocated to the UE. This possible design provides a technical solution for determining the type of the sequence of the first RS.

In a possible design, if the configuration information of the first RS includes the generation mode of the sequence of the first RS, the determining configuration information of a first RS may include: determining the generation mode of the sequence of the first RS based on at least one of a time-frequency characteristic of a channel corresponding to the first RS and the type of the sequence of the first RS. This possible design provides a technical solution for determining the generation mode of the sequence of the first RS.

In a possible design, if the configuration information of the first RS includes the resource multiplexing mode of the first RS, the determining configuration information of a first RS may include: determining the resource multiplexing mode of the first RS based on at least one of a time-frequency characteristic of a channel corresponding to the first port and phase noise added on the channel corresponding to the first port. This possible design provides a technical solution for determining the resource multiplexing mode of the first RS.

According to a second aspect, an RS configuration method is provided, including: receiving indication information; and determining configuration information of a first RS according to the indication information, where the first RS is an RS corresponding to a first port that is used in one transmission process, a second port is also used in the transmission process, and configuration information of an RS corresponding to the second port is different from the configuration information of the first RS. In a possible design, the indication information may be DCI, MAC signaling, or RRC signaling.

During actual implementation, the method may further include: receiving the first RS.

In a possible design, the indication information includes DCI or MAC signaling and is used to indicate the configuration information of the first RS. Before the receiving indication information, the method may further include: receiving system configuration signaling, where the system configuration signaling includes RRC signaling, the system configuration signaling includes at least one information entry, and one piece of configuration information of the first RS is recorded in each information entry.

In a possible design, if the indication information includes an identifier of a target pilot pattern, the determining configuration information of a first RS according to the indication information may include: obtaining the configuration information of the first RS based on the target pilot pattern. Optionally, the target pilot pattern is corresponding to the configuration information of the first RS.

In a possible design, the indication information includes DCI or MAC signaling and is used to indicate the target pilot pattern. Before the receiving indication information, the method may further include: receiving system configuration signaling, where the system configuration signaling includes RRC signaling, the system configuration signaling includes at least one information entry, and information about a pilot pattern of the first RS is recorded in each information entry.

In a possible implementation, if the indication information includes density information of a resource occupied by the first RS, the determining configuration information of a first RS according to the indication information may include: determining, based on the density information of the resource occupied by the first RS and according to a preset rule, location information of the resource occupied by the first RS, where the preset rule is a rule indicating a correspondence between the density information of the resource occupied by the first RS and the location information of the resource occupied by the first RS.

For explanations of related information (for example, the configuration information of the first RS and the indication information) in this aspect and beneficial effects of this aspect, refer to the first aspect. Details are not described herein again.

According to a third aspect, an RS configuration apparatus is provided. The apparatus includes a determining unit and a configuration unit. The determining unit is configured to determine configuration information of a first RS, where the first RS is an RS corresponding to a first port that is used in one transmission process, a second port is also used in the transmission process, and configuration information of an RS corresponding to the second port is different from the configuration information of the first RS. The configuration unit is configured to configure the first RS based on the configuration information of the first RS.

In a possible design, the apparatus may further include a sending unit, configured to send indication information, where the indication information is used to instruct a receive end to determine the configuration information of the first RS. In a possible design, the indication information may be DCI, MAC signaling, or RRC signaling.

During actual implementation, the sending unit may be further configured to send the configured first RS.

In a possible design, the indication information includes DCI or MAC signaling and is used to indicate the configuration information of the first RS. In this case, the sending unit may be further configured to send system configuration signaling, where the system configuration signaling includes RRC signaling, the system configuration signaling includes at least one information entry, and one piece of configuration information of the first RS is recorded in each information entry.

In a possible implementation, the determining unit may be specifically configured to: select a target pilot pattern from a preset pilot pattern set based on a current status of UE, where the current status of the UE includes at least one of the following information: a frame structure used by the UE to transmit information, a scenario in which the UE is located, a carrier frequency used for scheduling the UE, and a subcarrier spacing used by the UE to transmit the information; and obtain the configuration information of the first RS based on the target pilot pattern.

In a possible implementation, the apparatus may further include: a sending unit, configured to send indication information, where the indication information includes an identifier of the target pilot pattern. Optionally, the target pilot pattern is corresponding to the configuration information of the first RS.

In a possible implementation, the indication information includes DCI or MAC signaling and is used to indicate the target pilot pattern. The sending unit may be further configured to send system configuration signaling, where the system configuration signaling includes RRC signaling, the system configuration signaling includes at least one information entry, and information about a pilot pattern of the first RS is recorded in each information entry.

In a possible implementation, if the configuration information of the first RS includes a density of a resource occupied by the first RS, the determining unit may be specifically configured to determine, based on at least one of a time-frequency characteristic of a channel corresponding to the first port, phase noise of the channel corresponding to the first port, system information of UE, system configuration information of the UE, and a moving speed of the UE, the density of the resource occupied by the first RS, where the first port is any port allocated to the UE.

In a possible implementation, if the configuration information of the first RS includes a function carried by the first RS, the determining unit may be specifically configured to determine, based on at least one of a time-frequency characteristic of a channel corresponding to the first port and phase noise of the channel corresponding to the first port, the function carried by the first RS.

In a possible implementation, if the configuration information of the first RS includes a transmission waveform used by the first RS, the determining unit may be specifically configured to determine, based on at least one of channel quality information of a channel corresponding to the first port, a PAPR requirement of UE, and a quantity of scheduling layers of the UE, the transmission waveform used by the first RS, where the first port is any port allocated to the UE.

In a possible implementation, if the configuration information of the first RS includes a type of a sequence of the first RS, the determining unit may be specifically configured to determine the type of the sequence of the first RS based on at least one of a transmission waveform used by the first RS, a PAPR requirement of UE, and a scheduling flexibility requirement of the UE, where the first port is any port allocated to the UE.

In a possible implementation, if the configuration information of the first RS includes a generation mode of a sequence of the first RS, the determining unit may be specifically configured to determine the generation mode of the sequence of the first RS based on at least one of a time-frequency characteristic of a channel corresponding to the first RS and a type of the sequence of the first RS.

In a possible implementation, if the configuration information of the first RS includes a resource multiplexing mode of the first RS, the determining unit may be specifically configured to determine the resource multiplexing mode of the first RS based on at least one of a time-frequency characteristic of a channel corresponding to the first port and phase noise added on the channel corresponding to the first port.

For explanations of related information (for example, the configuration information of the first RS and the indication information) in this aspect and beneficial effects of this aspect, refer to the first aspect. Details are not described herein again.

According to a fourth aspect, an RS configuration apparatus is provided, including a receiving unit and a determining unit. The receiving unit is configured to receive indication information. The determining unit is configured to determine configuration information of a first RS according to the indication information, where the first RS is an RS corresponding to a first port that is used in one transmission process, a second port is also used in the transmission process, and configuration information of an RS corresponding to the second port is different from the configuration information of the first RS. In a possible design, the indication information may be DCI, MAC signaling, or RRC signaling.

In a possible design, the indication information includes DCI or MAC signaling and is used to indicate the configuration information of the first RS. In this case, the receiving unit is further configured to receive system configuration signaling, where the system configuration signaling includes RRC signaling, the system configuration signaling includes at least one information entry, and one piece of configuration information of the first RS is recorded in each information entry.

In a possible implementation, the indication information includes an identifier of a target pilot pattern. The determining unit is specifically configured to obtain the configuration information of the first RS based on the target pilot pattern.

In a possible design, the indication information includes DCI or MAC signaling and is used to indicate the target pilot pattern. In this case, the receiving unit is further configured to receive system configuration signaling, where the system configuration signaling includes RRC signaling, the system configuration signaling includes at least one information entry, and information about a pilot pattern of the first RS is recorded in each information entry.

For explanations of related information (for example, the configuration information of the first RS and the indication information) in this aspect and beneficial effects of this aspect, refer to the first aspect. Details are not described herein again.

According to a fifth aspect, an RS configuration apparatus is provided. The RS configuration apparatus may implement the functions executed in the example of the RS configuration method provided in the first aspect. The functions may be implemented by hardware or may be implemented by hardware executing corresponding software. The hardware or the software includes one or more modules corresponding to the foregoing functions.

In a possible design, a structure of the RS configuration apparatus includes a processor, a memory, a system bus, and a communications interface. The processor is configured to support the RS configuration apparatus in executing the corresponding functions in the foregoing method. The communications interface is configured to support communication between the RS configuration apparatus and another network element. The RS configuration apparatus may further include a memory. The memory is coupled to the processor and is configured to store a program instruction and data that are necessary for the RS configuration apparatus. The communications interface may be specifically a transceiver.

According to a sixth aspect, an embodiment of the present application provides a computer storage medium, configured to store a computer software instruction corresponding to the RS configuration method provided in the first aspect. The computer storage medium includes a program designed for performing the fifth aspect.

According to a seventh aspect, an RS configuration apparatus is provided. The RS configuration apparatus may implement the functions executed in the example of the RS configuration method provided in the third aspect. The functions may be implemented by hardware or may be implemented by hardware executing corresponding software. The hardware or the software includes one or more modules corresponding to the foregoing functions.

In a possible design, a structure of the RS configuration apparatus includes a processor, a memory, a system bus, and a communications interface. The processor is configured to support the RS configuration apparatus in executing the corresponding functions in the foregoing method. The communications interface is configured to support communication between the RS configuration apparatus and another network element. The RS configuration apparatus may further include a memory. The memory is coupled to the processor and is configured to store a program instruction and data that are necessary for the RS configuration apparatus. The communications interface may be specifically a transceiver.

According to an eighth aspect, an embodiment of the present application provides a computer storage medium, configured to store a computer software instruction corresponding to the RS configuration method provided in the third aspect. The computer storage medium includes a program designed for performing the sixth aspect.

It may be understood that any RS configuration apparatus or any computer storage medium provided above is configured to perform the corresponding method provided above. Therefore, for beneficial effects that can be achieved by any RS configuration apparatus or any computer storage medium, refer to the beneficial effects in the corresponding method provided above. Details are not described herein again.

DESCRIPTION OF EMBODIMENTS

Channel estimation is mainly performed to compensate for channel fading and noise, and during the channel estimation, an RS predicted by a transmit end and a receive end is used to track a time domain change and a frequency domain change of a channel. Specifically, the transmit end may enable different REs in time-frequency two-dimensional space to carry the RS, and send the carried RS to the receive end. Each transmit antenna (including a virtual antenna or a physical antenna) of the transmit end has an independent data channel, in other words, each port is corresponding to one channel. The receive end may perform channel estimation for each transmit antenna based on the predicted RS.

In a Long Term Evolution-Advanced (LTE-A) system, a plurality of types of RSs are defined, for example, a demodulation reference signal (DMRS), a cell-specific reference signal (CRS), and a channel state information-reference signal (CSI-RS). A function corresponding to each type of RS is single and fixed. For example, the DMRS is used to demodulate a physical downlink shared channel (PDSCH); the CRS is used to measure downlink channel quality, to perform resource scheduling and support a link adaptation technology; and the CSI-RS is used to measure quality of a channel corresponding to a physical antenna port. Each type of RS has a fixed antenna port configuration. For example, the CRS supports three antenna port configurations: one antenna port, two antenna ports, and four antenna ports, and corresponding port numbers are p=0, p={0, 1}, and p={0, 1, 2, 3}.

As described in the BACKGROUND, in one transmission process, an RS corresponding to each port is usually generated based on a fixed sequence, and then the RS corresponding to each port is mapped to a PRB in a fixed mapping mode based on a quantity of available ports. In addition, functions of RSs corresponding to all ports in one transmission process are single and are the same.

Figure 1:
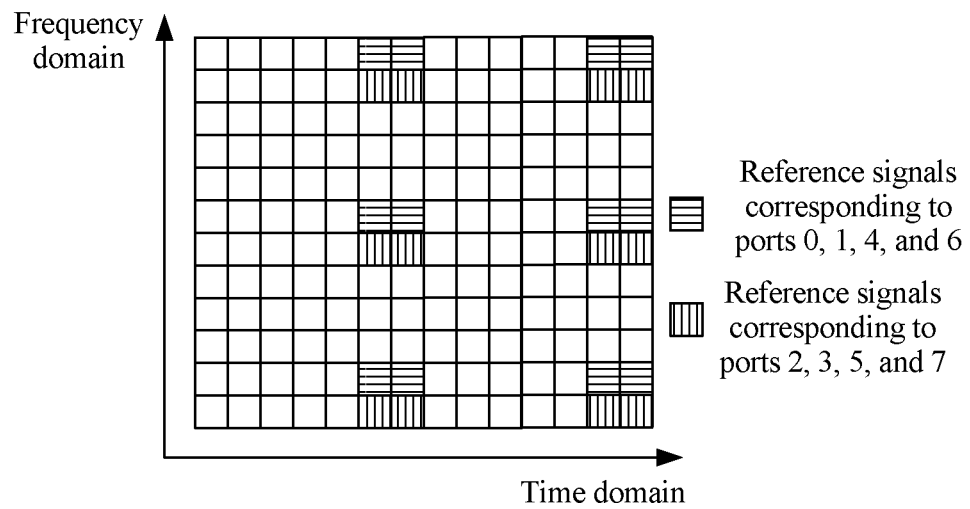
FIG. 1 is a pilot pattern according to the prior art.

A pilot pattern may be used to describe a time-frequency resource location of an RS corresponding to each port in a PRB in one transmission process. In an LTE system, each pilot pattern is preset, and both mapping rules and functions of RSs corresponding to all ports in each pilot pattern are the same. For example, a pilot pattern of a CSI-RS is determined based on configuration information of the CSI-RS, and each type of configuration information includes time-frequency resource locations in which RSs corresponding to different quantities of available ports are mapped in a subframe. FIG. 1 is a pilot pattern of a single-user (SU) DMRS in an LTE standard. It may be learned from FIG. 1 that there are eight available ports. Resource multiplexing modes of RSs corresponding to ports 0, 1, 4, and 6 are code division multiplexing (CDM), and modes of resource multiplexing between the RSs corresponding to the ports 0, 1, 4, and 6 and RSs corresponding to ports 2, 3, 5, and 7 are frequency division multiplexing (FDM).

An RS configured in the foregoing technical solution mainly has the following features:

1. RSs corresponding to all ports occupy a same density of time-frequency resources. For example, an RS corresponding to each of the ports 0 to 7 in FIG. 1 occupies 12 REs.

2. RSs corresponding to all ports carry a same function. For example, a DMRS corresponding to each port in the LTE system is used to demodulate data transmitted by using the corresponding port.

3. RSs corresponding to all ports use a same transmission waveform. For example, in the LTE system, a transmission waveform used by a DMRS corresponding to each port in a downlink direction is a multi-carrier waveform generated by using an orthogonal frequency division multiplexing (OFDM) technology, and a transmission waveform used by a DMRS corresponding to each port in an uplink direction is a single-carrier waveform generated by using a single carrier frequency division multiple access (SC-FDMA) technology.

4. Types of sequences of RSs corresponding to all ports are the same. For example, in the LTE system, a DMRS corresponding to each port in a downlink direction uses a Gold sequence.

5. Generation modes of sequences of RSs corresponding to all ports are the same. For example, in the LTE system, a generation mode of a DMRS corresponding to each port in a downlink direction is a full bandwidth generation mode. A generation mode of a DMRS corresponding to each port in an uplink direction is usually a zadoff-chu (ZC) sequence.

6. RSs corresponding to all ports use a same resource multiplexing mode. For example, an FDM plus CDM mode is used for resource multiplexing between DMRSs corresponding to all ports in the LTE system.

In the foregoing technical solution, except the foregoing features, configuration information of an RS corresponding to each port keeps unchanged once the RS is configured. It may be learned from this that the foregoing technical solution may be understood as configuring an RS by using a quantity of available ports as a granularity.

As a 5G new radio (NR) system imposes a requirement on a plurality of scenarios, a plurality of frequency bands, a plurality of transmission modes, and the like, a future communications system needs to face a plurality of complex communication scenarios, such as a high frequency band scenario or a high frequency selection scenario. Obviously, the foregoing technical solution for configuring an RS by using a quantity of available ports as a granularity cannot be applied to the future communications system.

In view of the above, the embodiments of the present application provide an RS configuration method and apparatus, and a basic principle of the method and the apparatus is as follows: In one transmission process, configuration information of RSs corresponding to different ports may be different, that is, a transmit end may configure an RS by using a port as a granularity. In an optional embodiment, the transmit end may configure configuration information of an RS corresponding to each port in real time or semi-statically. In another optional embodiment, the transmit end may configure an RS by using UE as a granularity. Specifically, the transmit end selects a target pilot pattern from a preset pilot pattern set based on a current status of the UE, and determines, by using a correspondence between each preset pilot pattern and configuration information, configuration information corresponding to the target pilot pattern, to configure, by using the target pilot pattern and the determined configuration information, configuration information of an RS corresponding to each port.

The technical solutions provided in the embodiments of this application can be applied to various communications systems. Particularly, the technical solutions are applicable to a future evolved network, for example, a 5G communications system such as a 5G NR system. In addition, the technical solutions can also be applied to current 2G, 3G, and 4G communications systems, for example, an LTE system, a cellular system related to the 3rd Generation Partnership Project (3GPP), and other such communications systems.

It should be noted that, the 5G communications system may include a machine-to-machine (M2M) communication scenario, a macro-micro communication scenario, and the like. These communication scenarios may include but are not limited to communication between UEs, communication between base stations, communication between a base station and UE, and the like. It may be understood that the technical solutions provided in the embodiments of the present application can be applied to any one of the foregoing communication scenarios. An example in which the technical solutions provided in the embodiments of the present application are applied to communication between a base station and UE is used below for description.

Figure 2:
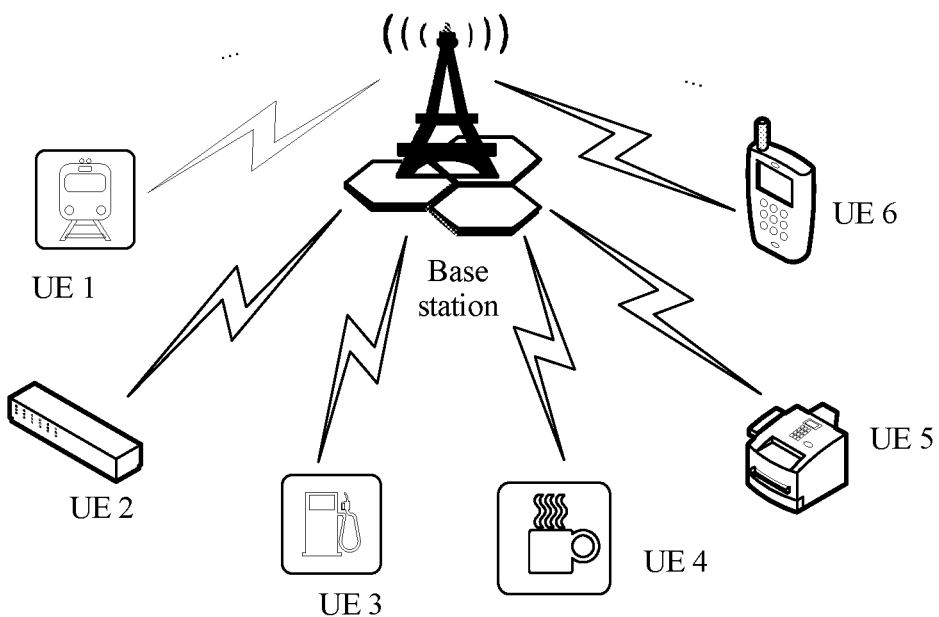
FIG. 2 is a schematic diagram of a system architecture to which the technical solutions provided in the embodiments of the present application are applicable.

The technical solutions provided in the embodiments of the present application can be applied to a system architecture shown in FIG. 2. The system architecture may include one or more base stations, and one or more UEs connected to each base station. In FIG. 2, an example in which the system architecture includes one base station and a plurality of UEs connected to the base station is used for description.

The technical solutions provided in the embodiments of the present application can be applied to a scenario in which a downlink RS is configured, for example, a base station configures an RS. In this case, a transmit end may be a base station, and a receive end may be UE. The technical solutions can also be applied to a scenario in which an uplink RS is configured, for example, a scenario in which UE configures an RS. In this case, the transmit end may be UE, and the receive end may be a base station. If there is no further explanation, an example in which a base station configures an RS is used below for description. It should be noted that, in the embodiments of the present application, the transmit end is a device that configures and sends an RS, and the receive end is a device that receives an RS.

The following describes the technical solutions in the embodiments of the present application by using examples with reference to the accompanying drawings in the embodiments of the present application. Obviously, the described embodiments are merely a part rather than all of the embodiments of the present application.

Figure 3:
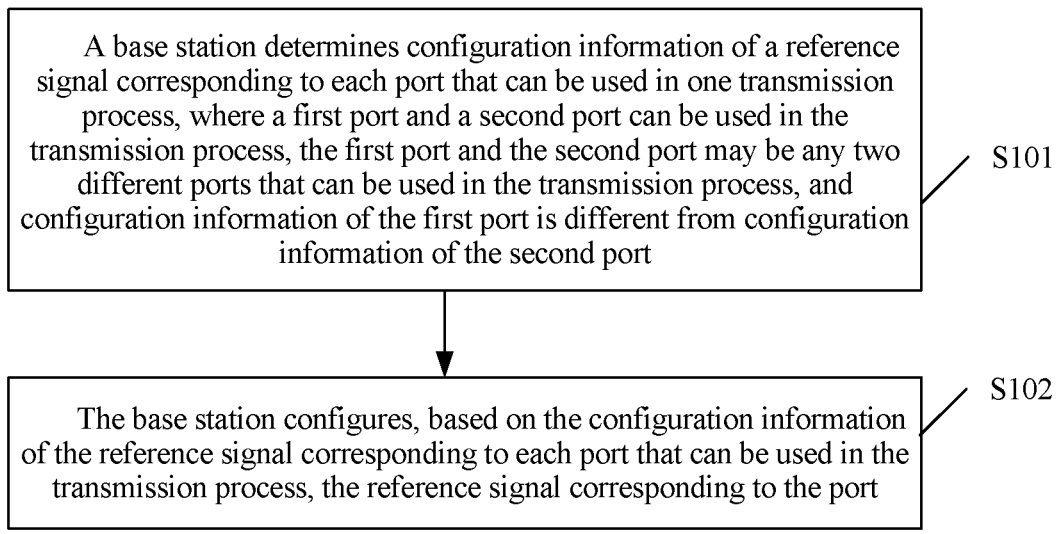
FIG. 3 is a schematic flowchart of an RS configuration method according to an embodiment of the present application.

FIG. 3 shows an RS configuration method according to an embodiment of the present application. The method may include the following steps S101 and S102.

S101. A base station determines configuration information of an RS corresponding to each port that can be used in one transmission process, where a first port and a second port can be used in the transmission process, the first port and the second port may be any two different ports that can be used in the transmission process, and configuration information of the first port is different from configuration information of the second port.

The first port and the second port may be two ports allocated by the base station to same UE or may be two ports allocated by the base station to different UEs.

One transmission process may be understood as one transmission period. A time domain resource allocated in one transmission process may be a transmission time interval (TTI) or a symbol-level short TTI in an LTE system, a short TTI with a large subcarrier spacing in a high frequency system, a slot or a mini-slot in a 5G system, or the like. This is not limited in this embodiment of the present application. A time-frequency resource used in one transmission process is one PRB.

The base station may determine, at intervals of several transmission processes, configuration information of an RS corresponding to each port that can be used in a next transmission process. Quantities of transmission processes that are spaced between any two processes of determining configuration information of an RS corresponding to each port that can be used in a next transmission process may be the same or may be different. This may be specifically determined based on an actual communication environment. For example, before each transmission process, the base station may determine configuration information of an RS corresponding to each port that can be used in the transmission process.

An RS in this embodiment of the present application may include but is not limited to any one of the following RSs: a DMRS, a CRS, and a CSI-RS. In addition, the RS may alternatively be a newly defined RS.

Optionally, if an RS corresponding to the first port is marked as a first RS, configuration information of the first RS may include but is not limited to at least one of the following information:

(1) Density of a Resource Occupied by the First RS.

A density of a resource occupied by an RS is a ratio of a quantity of REs occupied by the RS to a quantity of REs used in a current transmission process. Specifically, the density of the resource occupied by the RS may be a density of a time domain resource occupied by the RS, that is, a ratio of a quantity of time domain resources occupied by the RS to a quantity of time domain resources used in the current transmission process. Alternatively, the density of the resource occupied by the RS may be a density of a frequency domain resource occupied by the RS, that is, a ratio of a quantity of frequency domain resources occupied by the RS to a quantity of frequency domain resources used in the current transmission process. Alternatively, the density of the resource occupied by the RS may be a density of a time-frequency resource occupied by the RS, that is, a ratio of a quantity of time-frequency resources occupied by the RS to a quantity of time-frequency resources used in the current transmission process.

In different transmission processes, densities of resources occupied by RS corresponding to a same port may be the same or may be different.

(2) Function Carried by the First RS.

A function carried by an RS may include but is not limited to at least one of the following: data demodulation, phase noise compensation, Doppler frequency shift compensation, channel estimation, beam management, and the like. Optionally, the RS corresponding to the first port may carry at least two functions. In this way, system resource overheads can be reduced through function multiplexing. For example, a DMRS may be used for data demodulation, phase noise compensation, and Doppler frequency shift compensation, and a CSI-RS may be used for channel estimation and beam management.

In different transmission processes, RSs corresponding to a same port may carry a same function or may carry different functions.

It may be understood that in an existing standard, an RS such as a DMRS, a CRS, or a CSI-RS is used to carry a specific function. In this embodiment of the present application, a transmit end and a receive end may not distinguish a type of an RS, but merely focus on a function carried by the RS. For example, both the DMRS and the CRS may be used for data demodulation and phase noise compensation.

(3) Transmission Waveform Used by the First RS.

A transmission waveform used by an RS may include a single-carrier waveform or a multi-carrier waveform. In this embodiment of the present application, a single-carrier technology and a multi-carrier technology are not limited. In different transmission processes, RSs corresponding to a same port may use a same transmission waveform or may use different transmission waveforms.

(4) Type of a Sequence of the First RS.

A type of a sequence of an RS may include but is not limited to any one of the following: a ZC sequence, a Gold sequence, a pseudonoise (PN) sequence, and the like. In different transmission processes, types of sequences of RSs corresponding to a same port may be the same or may be different.

(5) Generation Mode of the Sequence of the First RS.

A generation mode of a sequence of an RS may include but is not limited to a full bandwidth generation mode, a generation mode based on several resource blocks (RB), a generation mode based on scheduling bandwidth of UE, and the like. In different transmission processes, generation modes of sequences of RSs corresponding to a same port may be the same or may be different.

(6) Resource Multiplexing Mode of the First RS.

The resource multiplexing mode of the first RS is a mode of resource multiplexing between the first RS and another RS. The another RS may include a second RS or may not include a second RS. Ports corresponding to all RSs for resource multiplexing form one port group, and each port group may include at least two ports. A resource multiplexing mode of an RS corresponding to each port in each port group may include but is not limited to at least one of the following: CDM, FDM, and time division multiplexing (TDM).

In different transmission processes, resource multiplexing modes of RSs corresponding to all ports in a same port group may be the same or may be different.

Optionally, an RS corresponding to the second port is marked as the second RS. In this case, the configuration information of the first RS is different from configuration information of the second RS, and this may include but is not limited to at least one of the following information: (a) the density of the resource occupied by the first RS is different from a density of a resource occupied by the second RS; (b) the function carried by the first RS is different from a function carried by the second RS; (c) the transmission waveform used by the first RS is different from a transmission waveform used by the second RS; (d) the type of the sequence of the first RS is different from a type of a sequence of the second RS; (e) the generation mode of the sequence of the first RS is different from a generation mode of the sequence of the second RS; and (f) the resource multiplexing mode of the first RS is different from a resource multiplexing mode of the second RS.

S102: The base station configures, based on the configuration information of the RS corresponding to each port that can be used in the transmission process, the RS corresponding to the port.

Configuring an RS corresponding to a port may be configuring the RS corresponding to the port for the first time or may be reconfiguring the RS corresponding to the port. The reconfiguring the RS corresponding to the port may be understood as adjusting current configuration information of the RS corresponding to the port.

After S102, the method may further include: sending, by the base station, a configured RS.

In the RS configuration method provided in this embodiment of the present application, in one transmission process, configuration information of RSs corresponding to different ports may be different. In other words, a technical solution for configuring an RS by using a port as a granularity is provided, and can be more adaptable to a complex and changeable scenario compared with a technical solution for configuring an RS by using a quantity of available ports as a granularity provided in the prior art. During specific implementation, an RS is configured based on an actual requirement, so that accuracy of a channel estimation result can be improved.

In an embodiment of this application, the method may further include: sending, by the base station, indication information, where the indication information is used to instruct a receive end to determine the configuration information of the first RS. The indication information includes any one of the following information: DCI, MAC signaling, or RRC signaling. Optionally, the indication information may include the configuration information of the first RS or an index of the configuration information of the first RS.

In another embodiment of this application, the method may further include the following steps a and b.

a: The base station sends system configuration signaling, where the system configuration signaling includes at least one information entry, and one piece of configuration information of the first RS is recorded in each information entry.

The "configuration information" recorded in each information entry may be any type of configuration information provided above, for example, any one of the density of the resource occupied by the first RS, the function carried by the first RS, and the transmission waveform used by the first RS. A same type of configuration information may be recorded in different information entries. For example, the density of the resource occupied by the first RS is recorded as a density 1 in an information entry 1, and the density of the resource occupied by the first RS is recorded as a density 2 in an information entry 2. Different types of configuration information may be recorded in different information entries. For example, the density of the resource occupied by the first RS is recorded as the density 1 in the information entry 1, and the transmission waveform used by the first RS is recorded as a transmission waveform 1 in the information entry 2.

The system configuration signaling may be implemented by multiplexing one piece of signaling in the prior art. For example, the system configuration signaling may be implemented by multiplexing one piece of RRC signaling in the prior art. In addition, the system configuration signaling may alternatively be one piece of new signaling provided in this application, and this is not limited in this application.

b. The base station sends indication information, where the indication information may include DCI or MAC signaling, and the indication information is used to indicate the configuration information of the first RS. The configuration information may be one of at least one piece of configuration information in the at least one information entry configured in step a.

The at least one information entry in step a is a total of four information entries, and one density of the resource occupied by the first RS is recorded in each information entry. For example, the density of the resource occupied by the first RS is recorded as a density 1 in an information entry 1, the density of the resource occupied by the first RS is recorded as a density 2 in an information entry 2, the density of the resource occupied by the first RS is recorded as a density 3 in the information entry 3, and the density of the resource occupied by the first RS is recorded as a density 4 in the information entry 4. In step b, the base station may indicate one of the four densities by using DCI or MAC signaling. Specifically, a density value may be directly indicated or an index of the density value may be indicated.

The configuration information that is of the first RS and that is configured by using the system configuration signaling may be configuration information that is of the first RS and that can be used by a terminal, and the configuration information that is of the first RS and that is configured by using the indication information may be configuration information that is of the first RS and that is used by the terminal in a current configuration process.

In this embodiment, configuration information of an RS is semi-statically configured by using the system configuration signaling, so that dynamic indication overheads can be reduced. In addition, configuration information of an RS is dynamically configured by using the indication information, so that accuracy of an operation result in an operation process such as channel estimation performed based on the RS can be improved.

The following describes a method for determining configuration information of an RS by using an example of determining the configuration information of the first RS. Specifically, any one of the following implementations may be included:

1. The base station determines the configuration information of the first RS in real time or semi-statically. Details are as follows:

(I) The base station determines, in any one of the following manners, the density of the resource occupied by the first RS (namely, the information (1)).

Manner 1: The base station determines, based on a time-frequency characteristic of a channel corresponding to the first port, a density of a time-frequency resource occupied by the first RS.

The base station may measure, based on an RS such as an RS (for example, a CRS, a CSI-RS, or a DMRS) in an existing standard or a newly designed RS, the time-frequency characteristic of the channel corresponding to the first port, and determine, based on the time-frequency characteristic, the density of the resource occupied by the first RS. The time-frequency characteristic may include but is not limited to at least one of a Doppler frequency shift, a multipath delay, and the like.

The base station may determine a time domain density based on the Doppler frequency shift. Optionally, a larger Doppler frequency shift indicates that the determined time domain density is higher. The Doppler frequency shift is usually caused by mobility of UE. For example, if a Doppler frequency shift of the channel corresponding to the first port is greater than 700 Hz (Hertz), a time domain density corresponding to the first port needs to be at least 3 REs/subframe (that is, at least 3 REs in each subframe are used to carry an RS), to ensure channel estimation accuracy. If the Doppler frequency shift of the channel corresponding to the first port is less than 7 Hz, channel estimation accuracy can be ensured provided that it is ensured that the time domain density corresponding to the first port is 1 RE/subframe.

The base station may determine a frequency domain density based on a maximum multipath delay. Optionally, a larger maximum multipath delay indicates that the determined frequency domain density is higher. For example, if a maximum multipath delay of the channel corresponding to the first port is at least 5000 ns (nanosecond), a density of a frequency domain resource occupied by the first RS needs to be at least 3 REs/PRB (that is, at least 3 REs within a full frequency band of each PRB are used to carry an RS). If the maximum multipath delay of the channel corresponding to the first port is 1000 ns to 5000 ns, the density of the frequency domain resource occupied by the first RS needs to be at least 2 REs/PRB. If the maximum multipath delay of the channel corresponding to the first port is less than 1000 ns, the density of the frequency domain resource occupied by the first RS needs to be at least 1 RE/PRB.

It may be understood that the base station may determine, based on information such as the maximum multipath delay and the Doppler frequency shift, the density of the time-frequency resource occupied by the first RS.

Manner 2: The base station determines a time domain density based on phase noise of a channel corresponding to the first port.

Louder phase noise indicates that the determined time domain density is higher. It may be understood that, when phase noise is louder, many RSs need to be set in time domain to avoid impact of the phase noise.

Manner 3: The base station determines, based on system information of UE, a density of a time-frequency resource occupied by the first RS, where the first port is any port allocated to the UE.

The base station may determine, based on system information corresponding to the first port such as an acknowledgement (ACK) indication or a negative acknowledgement (NACK) indication, the density of the time-frequency resource occupied by the first RS. The system information corresponding to the first port may be understood as system information transmitted on the first port. For example, if a quantity of times the base station receives a NACK indication of the UE within a preset time period is greater than a preset threshold, it indicates that at a current moment, a density of a time-frequency resource occupied by an RS corresponding to a port allocated to the UE is relatively low, and the base station may increase, in a subsequent transmission process, the density of the time-frequency resource occupied by the first RS.

Manner 4: The base station determines, based on system configuration information of UE, a density of a time-frequency resource occupied by the first RS, where the first port is any port allocated to the UE.

The base station may adjust, based on the system configuration information of the UE, for example, information such as frequency information or scheduling bandwidth of the UE, the density of the time-frequency resource occupied by the first RS. Specifically, if data of the UE is transmitted on a high frequency band, it indicates that a channel corresponding to a port allocated to the UE is relatively flat, and the base station may decrease, in a subsequent transmission process, the density of the time-frequency resource occupied by the first RS. If the data of the UE is transmitted on a low frequency band, the base station may increase, in the subsequent transmission process, the density of the time-frequency resource occupied by the first RS.

Manner 5: The base station determines, based on a moving speed of UE, a density of a time domain resource occupied by the first RS, where the first port is any port allocated to the UE.

Optionally, a higher moving speed of the UE indicates that the determined density of the time domain resource is higher. For example, if the moving speed of the UE is less than 30 kilometers per hour (km/h), the density of the time domain resource occupied by the first RS may be 1 RE/subframe. If the moving speed of the UE is 30 km/h to 300 km/h, the density of the time domain resource occupied by the first RS may be 2 REs/subframe. If the moving speed of the UE is greater than 300 km/h, the density of the time domain resource occupied by the first RS may be 3 REs/subframe.

It may be understood that, the base station may determine, in at least two of the foregoing manners 1 to 4, the density of the resource occupied by the first RS. For example, the base station may determine, based on the time-frequency characteristic of the channel corresponding to the first port and the system information corresponding to the first port, the density of the resource occupied by the first RS. Other examples are not enumerated. Certainly, this does not constitute a limitation during specific implementation.

It should be noted that, information (for example, the time-frequency characteristic of the channel corresponding to the first port or system configuration information corresponding to the first port) used by a transmit end to determine the density of the time domain resource occupied by the first RS may be obtained by the transmit end through measurement, or may not be obtained by the transmit end through measurement. If the information is not obtained by the transmit end through measurement, an execution body of the measurement may feed back related information to the transmit end. The related information may include but is not limited to at least one of the following information: a density adjustment requirement, a recommended density value, a frequency shift value, a multipath delay value, a phase noise value, and the like. These values such as the frequency shift value, the multipath delay value, and the phase noise value may be a statistical value, an instantaneous value, a quantized value, or the like.

In addition, it should be noted that, after configuring a density of a resource occupied by an RS corresponding to any port, the transmit end may further send indication information to a receive end, where the indication information is used to enable the receive end to learn of a location of a time-frequency resource occupied by a configured RS. Specifically, if the transmit end configures, for the first time, a density of a resource occupied by an RS corresponding to a port, the indication information may include a density value or a location of a time-frequency resource occupied by the RS, for example, an index of an RE occupied by the RS, where the RE index may be an index of a subcarrier in which the RE is located and an index of a symbol in which the RE is located. If the transmit end reconfigures a density of a resource occupied by an RS corresponding to a port, the indication information may include any one of the following information: an adjusted density value, a density adjustment direction, a density adjustment magnitude, a location of a time-frequency resource occupied by an adjusted RS, and the like.

It may be understood that, in a scenario in which the indication information is not the location of the time-frequency resource occupied by the configured RS, the transmit end and the receive end may preset a correspondence between the indication information (for example, a density value, a density adjustment direction, or a density adjustment magnitude) and the location of the time-frequency resource occupied by the RS, so that the receive end can determine, according to the indication information, the location of the time-frequency resource occupied by the RS.

Optionally, if the transmit end is the base station and the receive end is the UE, the base station may send the indication information to the UE by using RRC signaling or DCI.

(II) The base station determines, based on at least one of a time-frequency characteristic of a channel corresponding to the first port and phase noise of the channel corresponding to the first port, the function carried by the first RS (namely, the information (2)).

If a Doppler frequency shift of the channel corresponding to the first port is relatively large (for example, in a high-speed moving scenario), the function carried by the first RS may include Doppler frequency shift compensation.

If the phase noise of the channel corresponding to the first port is relatively loud (for example, in a high frequency scenario), the function carried by the first RS may include phase noise compensation and the like.

The method may further include: sending, by a transmit end, indication information to a receive end, where the indication information is used to indicate the function carried by the first RS. Optionally, in different scenarios, RSs of a same type corresponding to some ports, such as a DMRS, may additionally carry another function. In this case, the transmit end may indicate, to the receive end, the additional function added to the RS corresponding to the port.

It may be understood that, in this optional implementation, if functions carried by different RSs are different, processing procedures and estimation algorithms of the receive end for the different RSs are also different, so that system complexity can be reduced.

(III) The base station determines, in any one of the following manners, the transmission waveform used by the first RS (namely, the information (3)).

Manner 1: The base station determines, based on channel quality information of a channel corresponding to the first port, the transmission waveform used by the first RS.

The base station may receive the channel quality information, for example, information such as a signal-to-noise ratio (SNR) or a channel quality indication (CQI), that is fed back by UE and that is of the channel corresponding to the first port, to determine the transmission waveform used by the first RS. For example, if a value of the CQI is relatively large, the transmission waveform used by the first RS may be a single-carrier waveform. If the value of the CQI is relatively small, the transmission waveform used by the first RS may be a multi-carrier waveform.

Manner 2: The base station determines, based on a PAPR requirement of UE, the transmission waveform used by the first RS.

If a PAPR of the UE is less than or equal to a preset threshold, the transmission waveform used by the first RS may be a single-carrier waveform. If the PAPR of the UE is greater than the preset threshold, the transmission waveform used by the first RS may be a multi-carrier waveform. A specific value of the preset threshold is not limited in this embodiment of the present application. For example, UE with a relatively low PAPR may be UE on a cell edge, because an SNR of the UE on the cell edge is relatively low. A signal is sent by using a low PAPR, so that transmit power can be increased to improve receiving efficiency. On the contrary, UE with a relatively high PAPR may be UE in a cell center.

Manner 3: The base station determines, based on a quantity of scheduling layers of UE, the transmission waveform used by the first RS.

If the quantity of scheduling layers of the UE is 1, namely, rank=1, the transmission waveform used by the first RS may be a single-carrier waveform or a multi-carrier waveform. If the quantity of scheduling layers of the UE is greater than 1, the transmission waveform used by the first RS may be a multi-carrier waveform.

It may be understood that the base station may determine, in at least two of the foregoing manners 1 to 3, the transmission waveform used by the first RS. For example, the base station may determine, based on the channel quality information of the channel corresponding to the first port and a PAPR requirement of the UE, the density of the resource occupied by the first RS. Other examples are not enumerated. Certainly, this does not constitute a limitation during specific implementation.

The method may further include: sending, by a transmit end, indication information to a receive end, where the indication information is used to indicate the transmission waveform used by the first RS.

(IV) The base station determines the type of the sequence of the first RS (namely, the information (4)) based on at least one of the transmission waveform used by the first RS, a PAPR requirement of UE, and a scheduling flexibility requirement of the UE.

If the PAPR requirement of the UE is relatively high, the sequence of the first RS may be a ZC sequence. It should be noted that, the sequence is characterized by a low PAPR.

If the transmission waveform used by the first RS is a single-carrier waveform, the sequence of the first RS may be a ZC sequence. If the transmission waveform used by the first RS is a multi-carrier waveform, the sequence of the first RS may be a PN sequence.

It is difficult to find a ZC sequence that is relatively short and that is characterized by a low correlation. Therefore, if a scheduling granularity is relatively fine, for example, when a scheduling subband of the UE is fewer than three RBs, the sequence of the first RS may be a PN sequence.

The method may further include: sending, by a transmit end, indication information to a receive end, where the indication information is used to indicate the type of the sequence of the first RS.

(V) The base station determines the generation mode of the sequence of the first RS (namely, the information (5)) based on at least one of a time-frequency characteristic of a channel corresponding to the first RS and the type of the channel of the first RS.

If the sequence of the first RS is a PN sequence, the generation mode of the sequence of the first RS may be a full bandwidth generation mode. If the sequence of the first RS is a ZC sequence, the generation mode of the sequence of the first RS may be a generation mode based on scheduling bandwidth of the UE.

The method may further include: sending, by a transmit end, indication information to a receive end, where the indication information is used to indicate the generation mode of the sequence of the first RS. Optionally, if the generation mode of the sequence of the first RS is a generation mode based on several RBs, the indication information may include an index of each of the several RBs.

(VI) The base station may determine the resource multiplexing mode of the first RS (namely, the information (6)) in any one of the following manners.

Manner 1: The base station determines the resource multiplexing mode of the first RS based on a time-frequency characteristic of a channel corresponding to the first port.

If a multipath delay of the channel corresponding to the first port is relatively large, for example, in a scenario of a high-frequency selective channel in which the multipath delay is greater than 5000 nanosecond (ns), the resource multiplexing mode of the first RS may be FDM or lower-order CDM. If a value of the multipath delay of the channel corresponding to the first port is relatively small, for example, in a scenario of a frequency selective channel in which the multipath delay is less than 500 ns, the resource multiplexing mode of the first RS may be frequency domain CDM.

If a frequency shift of the channel corresponding to the first port is relatively large, the resource multiplexing mode of the first RS may be TDM. If the frequency shift of the channel corresponding to the first port is relatively small, the resource multiplexing mode of the first RS may be time domain CDM.

For example, on a high-frequency selective channel, ports 0 and 1 may use CDM in time domain, and the ports 0 and 1 and ports 2 and 3 use FDM multiplexing. On a fast time-varying channel, ports 0 and 2 may use CDM in frequency domain, and the ports 0 and 2 and ports 1 and 3 use a TDM multiplexing mode, to ensure that CDM performance is not affected by a channel characteristic. In addition, on a time-frequency dual-selective channel, an FDM plus TDM mode may be used for multiplexing between ports.

Manner 2: The base station determines the resource multiplexing mode of the first RS based on phase noise added on a channel corresponding to the first port.

If a value of the phase noise added on the channel corresponding to the first port is relatively large, the resource multiplexing mode of the first RS may be TDM. If the value of the phase noise added on the channel corresponding to the first port is relatively small, the resource multiplexing mode of the first RS may be time domain CDM.

For any method for measuring and feeding back information (for example, the time-frequency characteristic of the channel corresponding to the first port and the channel quality information of the channel corresponding to the first port) required for determining the configuration information of the first RS in (II) to (VI), refer to the foregoing (I). In addition, for (VI), the resource multiplexing mode may be switched by designing multiplexing mode adjustment signaling. For example, 1 bit may be used to indicate switching between TDM and time domain CDM, and 1 bit may be used to indicate switching between FDM and frequency domain CDM. Optionally, resource multiplexing modes of RSs in a same pilot pattern are switched by designing multiplexing mode adjustment signaling.

2. The base station selects a target pilot pattern from a preset pilot pattern set, to determine the configuration information of the first RS by using a correspondence between the target pilot pattern and the configuration information.

It may be understood that, a pilot pattern may reflect locations of time-frequency resources occupied by RSs corresponding to all ports in one transmission process. Optionally, resource multiplexing modes of RSs corresponding to all ports in one transmission process may be further learned of.

In this case, S102 may include: obtaining, by the base station, the configuration information of the first RS based on the target pilot pattern. The method may further include: sending, by the base station, indication information, where the indication information includes an identifier of the target pilot pattern. The identifier of the target pilot pattern may be a sequence number of the target pilot pattern, or the like.

In this embodiment, the receive end and the transmit end may pre-agree on pilot patterns in different scenarios and a correspondence between each pilot pattern and configuration information of RSs corresponding to a part or all of ports in one transmission process.

In an embodiment of this application, the method may further include: sending, by the base station, indication information, where the indication information is used to indicate the target pilot pattern. The indication information includes any one of the following information: DCI, MAC signaling, or RRC signaling. Optionally, the indication information may include an identifier of the target pilot pattern or information about the target pilot pattern.

The information about the pilot pattern may include at least one of the following information: a mapping mode of a time-frequency resource of the first RS, a port number corresponding to the first RS, a multiplexing mode of the first RS, a port mapping mode of the first RS, and the like.

In another embodiment of this application, the method may further include the following steps a and b.

a: The base station sends system configuration signaling, where the system configuration signaling includes at least one information entry, and information about a pilot pattern of the first RS is recorded in each information entry. For explanations of the information about the pilot pattern, refer to the foregoing descriptions. Details are not described herein again.

The system configuration signaling may be implemented by multiplexing one piece of signaling in the prior art. For example, the system configuration signaling may be implemented by multiplexing one piece of RRC signaling in the prior art. In addition, the system configuration signaling may alternatively be one piece of new signaling provided in this application, and this is not limited in this application.

b. The base station sends indication information, where the indication information may include DCI or MAC signaling, and the indication information is used to indicate the target pilot pattern. The target pilot pattern may be a pilot pattern indicated by the information about the pilot pattern recorded in the at least one information entry configured in step a.

The at least one information entry in step a is a total of four information entries, and each information entry records information about a possible pilot pattern of the first RS. An information entry 1 records information about a pilot pattern 1, an information entry 2 records information about a pilot pattern 2, an information entry 3 records information about a pilot pattern 3, and an information entry 4 records information about a pilot pattern 4. In step b, the base station may indicate, by using DCI or MAC signaling, one of the four pilot patterns as the target pilot pattern, and may specifically indicate an identifier of the pilot pattern.

A pilot pattern that is of the first RS and that is configured by using the system configuration signaling may be a pilot pattern that is of the first RS and that can be used by a terminal, and a pilot pattern (namely, the target pilot pattern) that is of the first RS and that is configured by using the indication information may be a pilot pattern that is of the first RS and that is used by the terminal in a current configuration process.

In this embodiment, a pilot pattern of an RS is semi-statically configured by using the system configuration signaling, so that dynamic indication overheads can be reduced. In addition, a pilot pattern of an RS is dynamically configured by using the indication information, so that accuracy of an operation result in an operation process such as channel estimation performed based on the RS can be improved.

Optionally, a division manner of a scenario corresponding to a preset pilot pattern in this embodiment of the present application is not limited. The following lists several examples:

Example 1

A scenario corresponding to a pilot pattern is distinguished based on a frame structure used by the UE to transmit information. The frame structure may include but is not limited to a frame structure whose time domain length is in any one of the following information: a TTI or a symbol-level short TTI in an LTE system, a short TTI with a large subcarrier spacing in a high frequency system, a slot or a mini-slot in a 5G system, and the like. For example, an RS in a pilot pattern corresponding to a frame structure that is relatively long in time domain has a relatively high time domain density and a relatively low frequency domain density, to better measure a time-varying characteristic.

Example 2

A scenario corresponding to a pilot pattern is distinguished based on a scenario in which the UE is located. The scenario in which the UE is located may include but is not limited to a rural scenario, an urban scenario, a high-speed railway scenario, and the like. For example, in a scenario in which a moving rate of the UE is relatively high such as a rural scenario or a high-speed railway scenario, a density of a time domain resource occupied by an RS in the pilot pattern is relatively high. On the contrary, in a scenario in which the moving rate of the user is relatively low such as an urban scenario, the density of the time domain resource occupied by the RS in the pilot pattern is relatively low.

Example 3

A scenario corresponding to a pilot pattern is distinguished based on a carrier frequency used for scheduling the UE. The carrier frequency used for scheduling the UE may include a high frequency, a low frequency, and an ultra-high frequency. For example, in a scenario in which a carrier frequency is relatively high, a function of an RS may include phase noise compensation.

Example 4

A scenario corresponding to a pilot pattern is distinguished based on a subcarrier spacing used by the UE to transmit the information. For example, in a scenario in which a subcarrier spacing is large, a frequency domain density of a resource occupied by an RS is relatively low, to overcome impact of frequency selection.

It may be understood that, during specific implementation, the configuration information of the first RS may be determined by randomly combining the foregoing plurality of manners. For example, when the configuration information of the first RS is configured for the first time, the base station may select the target pilot pattern from the preset pilot pattern set, and then determine the configuration information of the first RS by using the correspondence between the target pilot pattern and the configuration information. Subsequently, the base station may reconfigure the configuration information of the first RS in real time or semi-statically.

The following lists two specific examples. It should be noted that, a PRB may carry a control signal, an RS, a data signal, and the like. The following specific examples are described by using an example in which a control signal occupies a time-frequency resource including a first time domain symbol and full bandwidth of a PRB.

Figure 4:
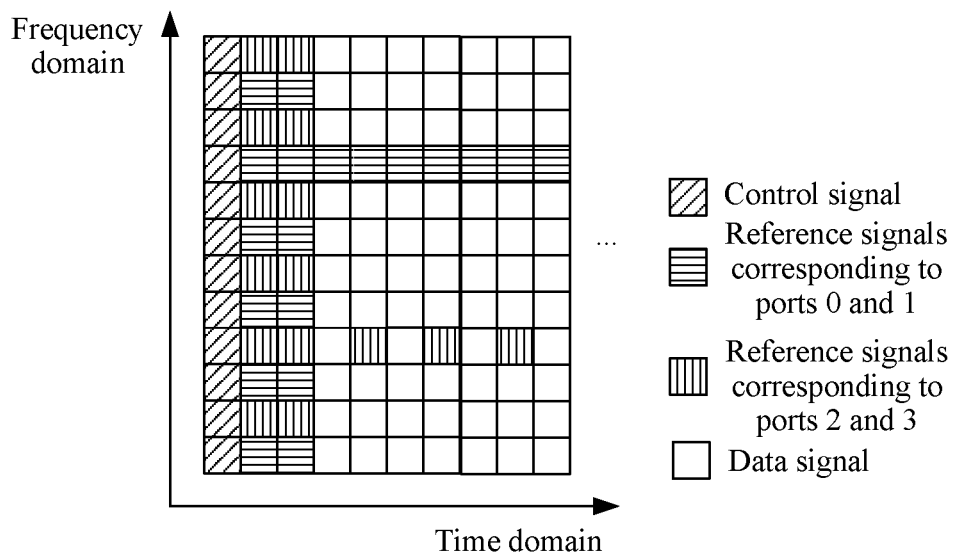
FIG. 4 is a pilot pattern according to an embodiment of the present application.

FIG. 4 is a pilot pattern corresponding to a high frequency scenario. In FIG. 4, resource multiplexing modes of RSs corresponding to ports 0 and 1 in time domain are CDM, and resource multiplexing modes of RSs corresponding to ports 2 and 3 in time domain are CDM. Resource multiplexing modes of the RSs corresponding to the ports 0 and 1 and the RSs corresponding to the ports 2 and 3 in time domain are FDM. To perform channel estimation, the ports 0, 1, 2, and 3 are evenly distributed at a front end of a PRB, and an RS corresponding to each port occupies 12 REs. At a back end of the PRB, the RSs corresponding to the ports 0 and 1 are consecutively distributed in time domain and occupy 7 REs, and the RSs corresponding to the ports 2 and 3 are distributed at fixed intervals in time domain and occupy 3 REs.

In this embodiment, the base station may determine a type and a generation mode of a sequence of an RS in the manner provided above, and generate the RS; and then map the RS to a time-frequency resource by using the pilot pattern shown in FIG. 4, and send the RS to the UE. The UE may learn of, in the manner provided above, configuration information of each RS in the pilot pattern shown in FIG. 4, to implement channel information parameter measurement and phase noise measurement and compensation. A mapping mode and a function of an RS in this embodiment can ensure relatively low pilot consumption while suppressing phase noise.

Figure 5:
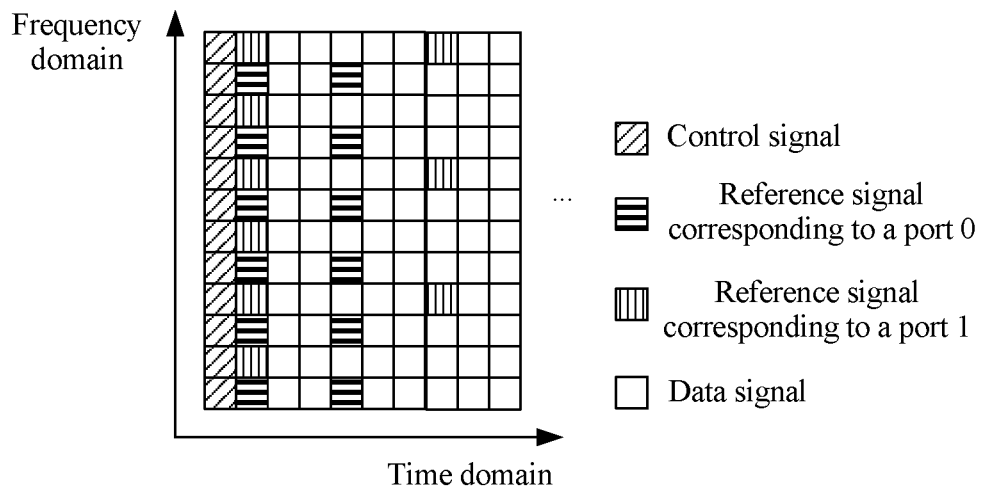
FIG. 5 is another pilot pattern according to an embodiment of the present application.

FIG. 5 is a pilot pattern corresponding to a high-speed moving scenario. In FIG. 5, resource multiplexing modes of RSs corresponding to ports 0 and 1 in frequency domain are FDM. To perform channel estimation, the ports 0 and 1 are evenly distributed at a front end of a PRB, and an RS corresponding to each port occupies 6 REs. To accurately estimate channel information of a fast time-varying channel in the high-speed moving scenario, at a back end of the PRB, the RSs corresponding to the ports 0 and 1 are distributed on different symbols and occupy different subcarriers, that is, a resource multiplexing mode is TDM plus FDM. An RS corresponding to the port 0 occupies 6 REs, and an RS corresponding to the port 1 occupies 3 REs.

In this embodiment, the base station may determine a type and a generation mode of a sequence of an RS in the manner provided above, and generate the RS; and then map the RS to a time-frequency resource by using the pilot pattern shown in FIG. 5, and send the RS to the UE. The UE may learn of, in the manner provided above, configuration information of each RS in the pilot pattern shown in FIG. 5, to measure an information parameter of the fast time-varying channel. In this embodiment, irregular mapping modes of different RSs can ensure channel estimation accuracy while effectively reducing pilot overheads.

The foregoing description is provided from a perspective of configuring an RS by a transmit end. The embodiments of the present application further provide a method for configuring an RS by a receive end. An example in which the receive end is UE is used below for description.

Figure 6:
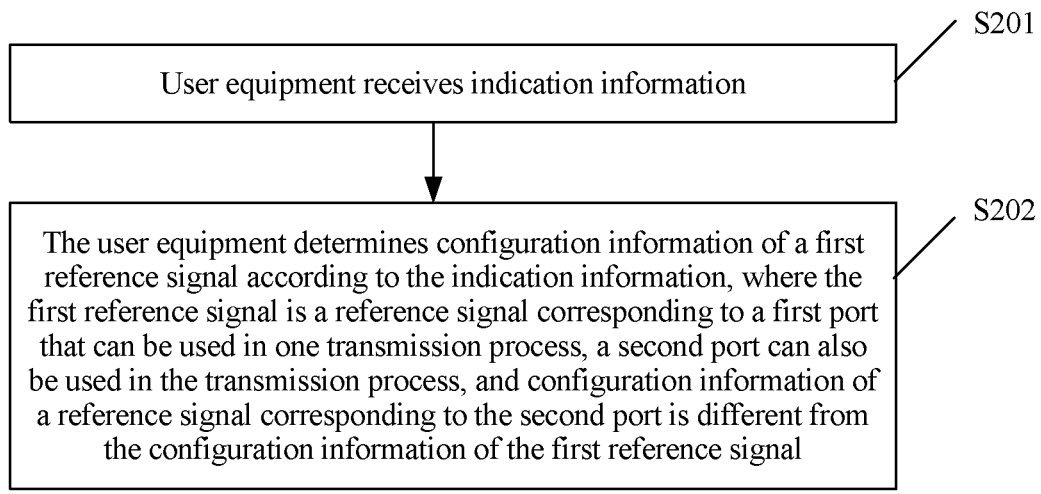
FIG. 6 is a schematic flowchart of another RS configuration method according to an embodiment of the present application.

FIG. 6 is a schematic flowchart of an RS configuration method according to an embodiment of the present application. The method may include the following steps S201 and S202.

S201: UE receives indication information.

S202: The UE determines configuration information of a first RS according to the indication information, where the first RS is an RS corresponding to a first port that can be used in one transmission process, a second port can also be used in the transmission process, and configuration information of an RS corresponding to the second port is different from the configuration information of the first RS.

Optionally, the indication information includes an identifier of a target pilot pattern. In this case, S202 may include: obtaining the configuration information of the first RS based on the target pilot pattern.

For explanations and beneficial effects of related content in this embodiment, refer to the foregoing descriptions. Details are not described herein again.

The solutions provided in the embodiments of the present application are mainly described above from a perspective of a transmit end and a perspective of a receive end. It may be understood that, to implement the foregoing functions, the transmit end and the receive end include corresponding hardware structures and/or corresponding software modules for executing various functions. A person skilled in the art should easily be aware that, in combination with the examples described in the embodiments disclosed in this specification, units and algorithm steps may be implemented by hardware or a combination of hardware and computer software in the present application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present application, function module division may be performed on the RS configuration apparatus based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, the module division in the embodiments of the present application is an example, and is merely logical function division. There may be another division manner during actual implementation.

Figure 7:
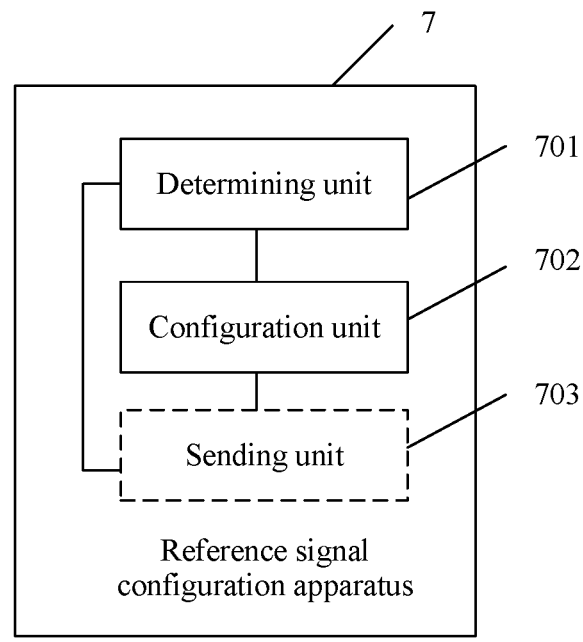
FIG. 7 is a schematic structural diagram of an RS configuration apparatus according to an embodiment of the present application.

FIG. 7 is a schematic structural diagram of an RS configuration apparatus 7 according to an embodiment of the present application. The apparatus 7 includes a determining unit 701 and a configuration unit 702. Optionally, the apparatus 7 may further include a sending unit 703. A function of each of the function modules may be deduced from steps of each method embodiment provided above. Alternatively, for a function of each of the function modules, refer to the content provided in the SUMMARY part. For example, the determining unit 701 may be configured to perform an action performed by the base station in S101 in FIG. 3, and/or may be configured to support another process of the technology described in this specification. The configuration unit 702 may be configured to perform an action performed by the base station in S102 in FIG. 3, and/or may be configured to support another process of the technology described in this specification.

In hardware implementation, the sending unit 703 may be a transmitter, and may form a transceiver together with a receiver. The determining unit 701 and the configuration unit 702 may be built in or independent of a memory of the RS configuration apparatus 7 in a hardware form, so that a processor invokes and performs an operation corresponding to each of the foregoing units.

Figure 8:
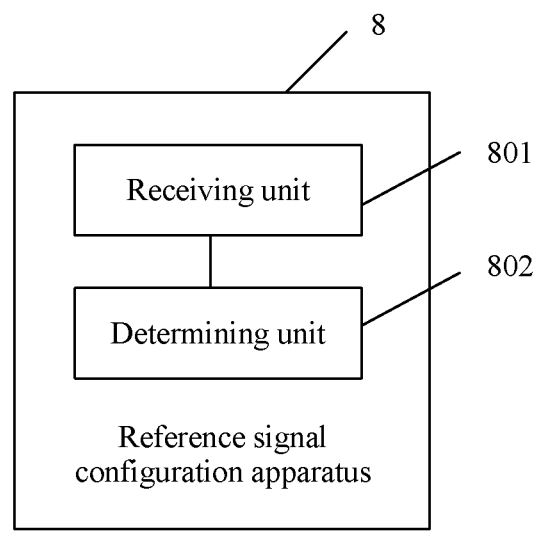
FIG. 8 is a schematic structural diagram of another RS configuration apparatus according to an embodiment of the present application.

FIG. 8 is a schematic structural diagram of an RS configuration apparatus 8 according to an embodiment of the present application. The apparatus 8 may include a receiving unit 801 and a determining unit 802. A function of each of the function modules may be deduced from steps of each method embodiment provided above. Alternatively, for a function of each of the function modules, refer to the content provided in the SUMMARY part. For example, the receiving unit 801 may be configured to perform an action performed by the base station in S201 in FIG. 6, and/or may be configured to support another process of the technology described in this specification. The determining unit 802 may be configured to perform an action performed by the base station in S202 in FIG. 6, and/or may be configured to support another process of the technology described in this specification.

In hardware implementation, the receiving unit 801 may be a receiver, and may form a transceiver together with a transmitter. The determining unit 802 may be built in or independent of a memory of the RS configuration apparatus 8 in a hardware form, so that a processor invokes and performs an operation corresponding to each of the foregoing units.

Figure 9:
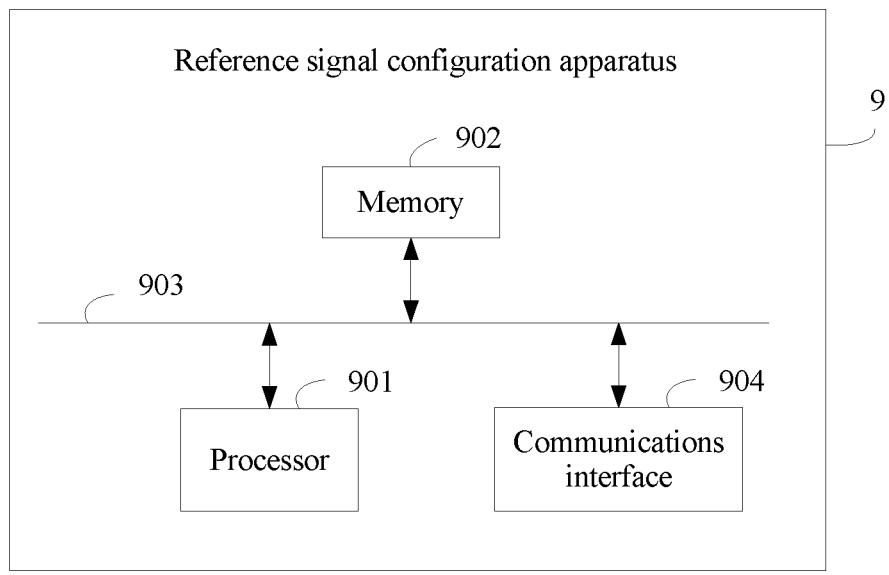
FIG. 9 is a schematic structural diagram of another RS configuration apparatus according to an embodiment of the present application.

FIG. 9 is a schematic structural diagram of an RS configuration apparatus 9 according to an embodiment of the present application. The apparatus 9 may include a processor 901, a memory 902, a system bus 903, and a communications interface 904. The processor 901, the memory 902, and the communications interface 904 are connected through the system bus 903. The memory 902 is configured to store a computer executable instruction. When the apparatus 9 runs, the processor 901 executes the computer executable instruction stored in the memory 902, so that the apparatus 9 performs any RS configuration method provided above. For a specific RS configuration method, refer to the foregoing descriptions and related descriptions in the accompanying drawings. Details are not described herein again.

This embodiment of the present application further provides a storage medium. The storage medium may include the memory 902.

The processor 901 may be a processor, or may be a general name of a plurality of processing elements. For example, the processor 901 may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the present application. The general purpose processor may be a microprocessor, or the processor may be any conventional processor or the like. Alternatively, the processor 901 may be a dedicated processor. The dedicated processor may include at least one of a baseband processing chip, a radio-frequency processing chip, and the like. Further, the dedicated processor may further include a chip having another dedicated processing function of the apparatus 9.

The memory 902 may include a volatile memory, for example, a random access memory (RAM); or the memory 902 may include a non-volatile memory, for example, a read-only memory (ROM), a flash memory, a hard disk drive (HDD), or a solid-state drive (SSD); or the memory 902 may include a combination of the foregoing memories.

The system bus 903 may include a data bus, a power bus, a control bus, a signal status bus, and the like. For clarity of description in this embodiment, various buses are marked as the system bus 903 in FIG. 9.

The communications interface 904 may be specifically a transceiver of the apparatus 9. The transceiver may be a wireless transceiver. For example, the wireless transceiver may be an antenna of the apparatus 9. The processor 901 receives data from or sends data to another device such as a base station through the communications interface 904.

In a specific implementation process, steps in the procedure of any RS configuration method provided above may be performed by the processor 901, in a hardware form, executing the computer executable instruction that is stored in the memory 902 and that is in a software form. To avoid repetition, details are not described herein again.

A person skilled in the art should be aware that in the foregoing one or more examples, functions described in the present application may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium, and the communications medium includes any medium that enables a computer program to be transmitted from one place to another. The storage medium may be any available medium accessible to a general-purpose or dedicated computer.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A reference signal configuration method, wherein the method comprises:
   determining configuration information of a first reference signal, wherein the first reference signal is a reference signal corresponding to a first port that is used in a transmission process, a second port is also used in the transmission process, and configuration information of a reference signal corresponding to the second port is different from the configuration information of the first reference signal; and
   configuring the first reference signal based on the configuration information of the first reference signal;
   wherein the configuration information of the first reference signal comprises:
   a density of a resource occupied by the first reference signal, wherein the density of the resource occupied by the first reference signal is a ratio of a quantity of resource elements occupied by the first reference signal to a quantity of resource elements used in the transmission process, and
   a generation mode of a sequence of the first reference signal, the generation mode of the sequence of the first reference signal being determined based on at least one of a time-frequency characteristic of a channel corresponding to the first reference signal or a type of the sequence of the first reference signal.

2. The method according to claim 1, wherein the configuration information of the first reference signal further comprises one or more of the following:
   a transmission waveform used by the first reference signal;
   the type of the sequence of the first reference signal; and
   a resource multiplexing mode of the first reference signal.

3. The method according to claim 1, wherein the method further comprises:
   sending indication information, wherein the indication information is used to instruct a receive end to determine the configuration information of the first reference signal.

4. The method according to claim 1, wherein the determining configuration information of a first reference signal comprises:
   selecting a target pilot pattern from a preset pilot pattern set based on a current status of user equipment, wherein the current status of the user equipment comprises at least one of the following information: a frame structure used by the user equipment to transmit information, a scenario in which the user equipment is located, a carrier frequency used for scheduling the user equipment, and a subcarrier spacing used by the user equipment to transmit the information; and
   obtaining the configuration information of the first reference signal based on the target pilot pattern.

5. The method according to claim 1, wherein the determining configuration information of a first reference signal comprises:
   determining, based on at least one of a time-frequency characteristic of a channel corresponding to the first port, phase noise of the channel corresponding to the first port, system information of user equipment, system configuration information of the user equipment, and a moving speed of the user equipment, the density of the resource occupied by the first reference signal, wherein the first port is any port allocated to the user equipment.

6. A reference signal configuration method, wherein the method comprises:
   receiving indication information; and
   determining configuration information of a first reference signal according to the indication information, wherein the first reference signal is a reference signal corresponding to a first port that is used in a transmission process, a second port is also used in the transmission process, and configuration information of a reference signal corresponding to the second port is different from the configuration information of the first reference signal;
   wherein the configuration information of the first reference signal comprises:

a density of a resource occupied by the first reference signal, wherein the density of the resource occupied by the first reference signal is a ratio of a quantity of resource elements occupied by the first reference signal to a quantity of resource elements used in the transmission process, and a generation mode of a sequence of the first reference signal, the generation mode of the sequence of the first reference signal being determined based on at least one of a time-frequency characteristic of a channel corresponding to the first reference signal or a type of the sequence of the first reference signal.

7. The method according to claim 6, wherein the configuration information of the first reference signal further comprises one or more of the following:

a transmission waveform used by the first reference signal;

the type of the sequence of the first reference signal; and a resource multiplexing mode of the first reference signal.

8. The method according to claim 6, wherein the indication information comprises an identifier of a target pilot pattern, and the determining configuration information of a first reference signal according to the indication information comprises:

obtaining the configuration information of the first reference signal based on the target pilot pattern.

9. The method according to claim 6, wherein the configuration information of a first reference signal is determined, based on at least one of a time-frequency characteristic of a channel corresponding to the first port, phase noise of the channel corresponding to the first port, system information of user equipment, system configuration information of the user equipment, and a moving speed of the user equipment, the density of the resource occupied by the first reference signal, wherein the first port is any port allocated to the user equipment.

10. A reference signal configuration apparatus, wherein the apparatus comprises a memory and a processor, the memory is configured to store a computer program, and when the computer program is executed by the processor, the following process is performed:

determining configuration information of a first reference signal, wherein the first reference signal is a reference signal corresponding to a first port that is used in a transmission process, a second port is also used in the transmission process, and configuration information of a reference signal corresponding to the second port is different from the configuration information of the first reference signal; and configuring the first reference signal based on the configuration information of the first reference signal;

wherein the configuration information of the first reference signal comprises:

a density of a resource occupied by the first reference signal, wherein the density of the resource occupied by the first reference signal is a ratio of a quantity of resource elements occupied by the first reference signal to a quantity of resource elements used in the transmission process, and a generation mode of a sequence of the first reference signal, the generation mode of the sequence of the first reference signal being determined based on at least one of a time-frequency characteristic of a channel corresponding to the first reference signal or a type of the sequence of the first reference signal.

11. The reference signal configuration apparatus according to claim 10, wherein the configuration information of the first reference signal further comprises one or more of the following:

a transmission waveform used by the first reference signal;

the type of the sequence of the first reference signal; and a resource multiplexing mode of the first reference signal.

12. The reference signal configuration apparatus according to claim 10, wherein when the computer program is executed by the processor, the following process is performed:

sending indication information, wherein the indication information is used to instruct a receive end to determine the configuration information of the first reference signal.

13. The reference signal configuration apparatus according to claim 10, wherein when the computer program is executed by the processor, the following process is performed:

selecting a target pilot pattern from a preset pilot pattern set based on a current status of user equipment, wherein the current status of the user equipment comprises at least one of the following information: a frame structure used by the user equipment to transmit information, a scenario in which the user equipment is located, a carrier frequency used for scheduling the user equipment, and a subcarrier spacing used by the user equipment to transmit the information; and obtaining the configuration information of the first reference signal based on the target pilot pattern.

14. The reference signal configuration apparatus according to claim 10, wherein when the computer program is executed by the processor, the following process is performed:

determining, based on at least one of a time-frequency characteristic of a channel corresponding to the first port, phase noise of the channel corresponding to the first port, system information of user equipment, system configuration information of the user equipment, and a moving speed of the user equipment, the density of the resource occupied by the first reference signal, wherein the first port is any port allocated to the user equipment.

15. A reference signal configuration apparatus, wherein the apparatus comprises a memory and a processor, the memory is configured to store a computer program, and when the computer program is executed by the processor, the following process is performed:

receiving indication information; and determining configuration information of a first reference signal according to the indication information, wherein the first reference signal is a reference signal corresponding to a first port that is used in a transmission process, a second port is also used in the transmission process, and configuration information of a reference signal corresponding to the second port is different from the configuration information of the first reference signal;

wherein the configuration information of the first reference signal comprises:

a density of a resource occupied by the first reference signal, wherein the density of the resource occupied by the first reference signal is a ratio of a quantity of resource elements occupied by the first reference signal to a quantity of resource elements used in the transmission process, and a generation mode of a sequence of the first reference signal, the generation mode of the sequence of the first reference signal being determined based on at least one of a time-frequency characteristic of a channel corresponding to the first reference signal or a type of the sequence of the first reference signal.

16. The reference signal configuration apparatus according to claim 15, wherein the configuration information of the first reference signal further comprises one or more of the following:

a transmission waveform used by the first reference signal;

the type of the sequence of the first reference signal; and a resource multiplexing mode of the first reference signal.

17. The reference signal configuration apparatus according to claim 15, wherein the indication information comprises an identifier of a target pilot pattern, and when the computer program is executed by the processor, the following process is performed:

obtaining the configuration information of the first reference signal based on the target pilot pattern.

18. The reference signal configuration apparatus according to claim 15, wherein the configuration information of a first reference signal is determined, based on at least one of a time-frequency characteristic of a channel corresponding to the first port, phase noise of the channel corresponding to the first port, system information of user equipment, system configuration information of the user equipment, and a moving speed of the user equipment, the density of the resource occupied by the first reference signal, wherein the first port is any port allocated to the user equipment.

* * * * *